United States Patent [19]

Musschoot

[11] Patent Number: 4,495,826
[45] Date of Patent: Jan. 29, 1985

[54] VIBRATORY APPARATUS

[75] Inventor: Albert Musschoot, Barrington, Ill.

[73] Assignee: General Kinematics Corporation, Barrington, Ill.

[21] Appl. No.: 420,602

[22] Filed: Sep. 20, 1982

Related U.S. Application Data

[63] Continuation-in-part of Ser. No. 250,112, Apr. 2, 1981, abandoned.

[51] Int. Cl.³ ............................................. F16H 33/10
[52] U.S. Cl. ......................................... 74/87; 74/61; 198/770
[58] Field of Search ...................... 198/768, 770, 766; 74/61, 571 L, 87

[56] References Cited

U.S. PATENT DOCUMENTS

| | | | |
|---|---|---|---|
| 2,839,937 | 6/1958 | Clafee | 74/61 |
| 3,358,815 | 12/1961 | Musschoot et al. | 74/61 |
| 4,111,061 | 9/1978 | Thomas | 74/61 |
| 4,348,912 | 9/1982 | Thomas | 74/61 |

FOREIGN PATENT DOCUMENTS

| | | |
|---|---|---|
| 590330 | 7/1947 | United Kingdom . |
| 769547 | 5/1955 | United Kingdom . |
| 1522627 | 7/1975 | United Kingdom . |

Primary Examiner—Joseph E. Valenza
Attorney, Agent, or Firm—Wood, Dalton, Phillips, Mason & Rowe

[57] ABSTRACT

A system for varying the vibration generating force of a rotating eccentric weight by providing a second weight movable from a position on one side of the axis of rotation of the eccentric weight to a second position on the opposite side of the axis of rotation, the movement being linear and radially across said axis of rotation. In addition, a spring may be employed to move the movable weight toward the second position initially, in compression, and later to resist additional movement in said direction, in tension, so as to provide basically a linear system for varying the vibrational force. Fluid pressure may be applied to the movable weight which pressure will combine with the tension in the spring to move the movable weight against centrifugal force and toward the axis of rotation of the wheel. Once the center of gravity of the weight passes the axis of rotation, further fluid pressure on the movable weight will act against the compression of the spring and will combine with the centrifugal force to move the movable weight radially outward from the axis of rotation.

14 Claims, 13 Drawing Figures

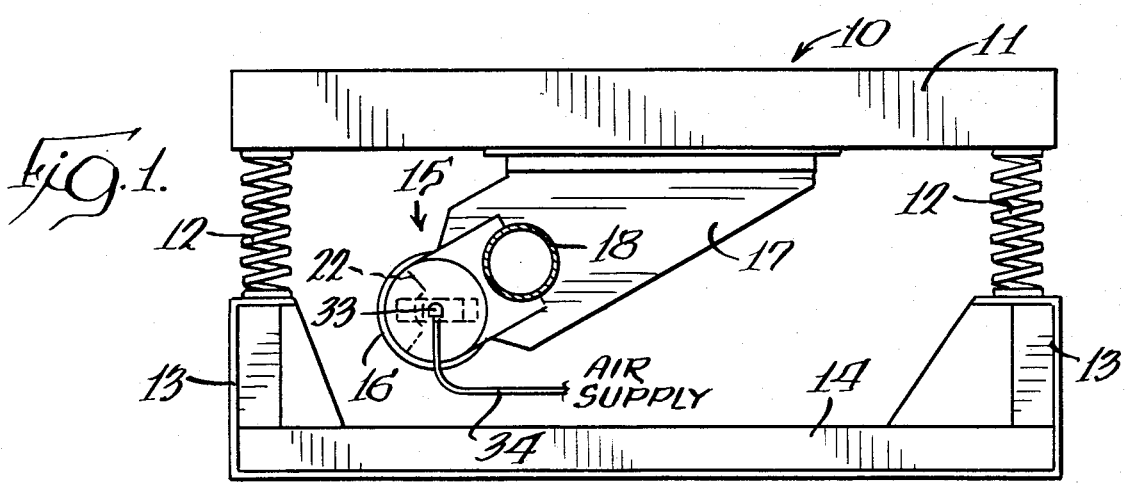
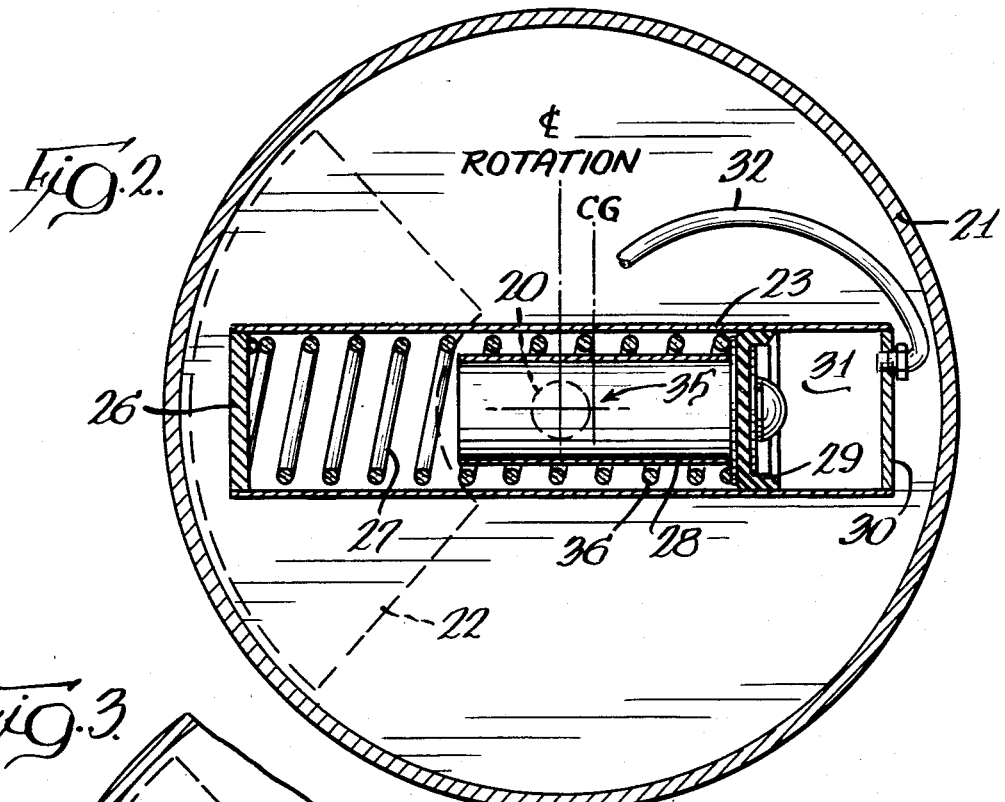
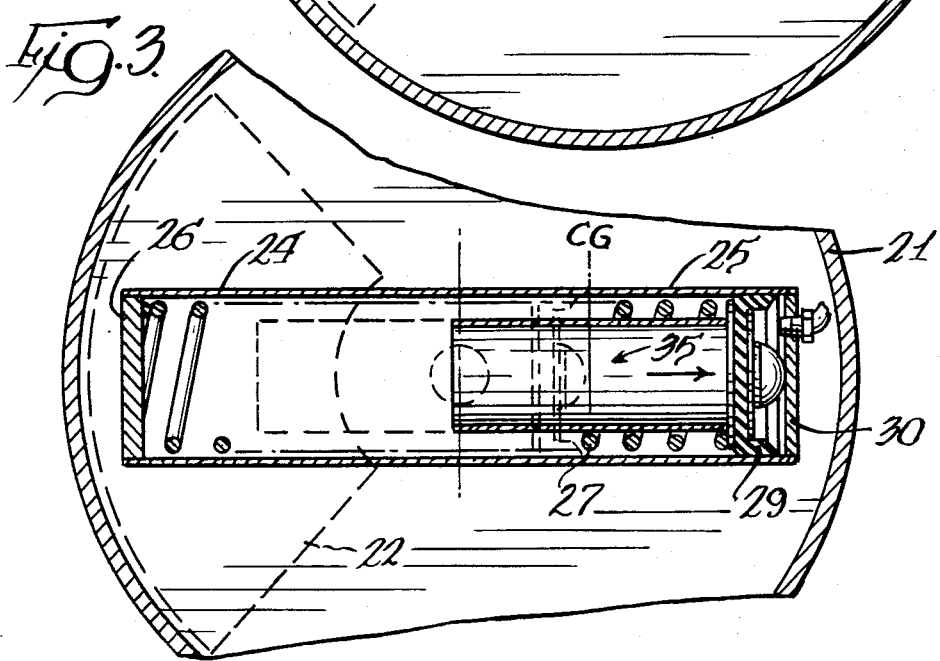

VIBRATORY APPARATUS

CROSS-REFERENCE

This application is a continuation-in-part of my copending application Ser. No. 250,112, filed Apr. 2, 1981, now abandoned.

BACKGROUND OF THE INVENTION

Vibratory feeding or conveying apparatus has been used in industry for many years. A basic type of vibratory feeder is shown in the Musschoot et al U.S. Pat. No. 3,089,582 wherein a two-mass exciter system is employed to impart vibratory movement to a material-carrying member or trough. In the vibration generating apparatus shown in that patent, a constant speed motor carries a pair of eccentric weights, one on each end of the motor shaft, and the vibrational force generated with operation of the motor is transmitted through a spring system to the material carrying trough. In the apparatus shown in said patent, the amplitude of vibration is constant, hence a constant nonvariable feed is provided.

An improved variable rate vibratory feeder is shown in Musschoot et al U.S. Pat. No. 3,358,815 wherein the electric motor carries at each end of its shaft a wheel-like member rotated with the shaft, with the wheel-like member being provided with a weight shiftable in an arcuate path from a first position near a fixed eccentric weight on each wheel to a second position opposite the fixed weight. The preferred system shown in the last-mentioned patent is one where the weight is a fluid, namely mercury, and thus readily susceptible to movement by varying the pressure. In some situations, mercury is considered as a pollutant and hence the mercury type of variable rate feeder has not been universally accepted.

SUMMARY OF THE PRESENT INVENTION

According to the present invention, a system is provided somewhat similar to that shown in my previous U.S. Pat. No. 3,358,815, but differing therefrom in that a metal weight may be used and the movement of the weight is not in a curved path around the axis of rotation, but rather in a linear path extending radially of the axis of rotation. Furthermore, the system may be utilized wherein a spring is employed to move the movable weight from a first position on the same side of the axis of rotation of the wheel-like member as a fixed eccentric weight, to a position on the opposite side of the axis of rotation, with the spring operating initially in compression to move the movable weight beyond said axis and the spring thereafter operating in tension, resisting but not preventing movement of the movable weight outwardly in response to centrifugal force. The movable weight includes a piston which is controlled by fluid pressure and because of the spring action just described, the ratio between fluid pressure and the movement of the movable weight is linear, thus greatly facilitating and simplifying the control.

As an alternative structure, in the stationary position the spring holds the movable weight in a first position on the same side of the axis of rotation as the fixed eccentric weight. Rotating the wheel-like member will load the spring in tension as the movable weight responds to centrifugal force. The spring resists but does not prevent outward movement of the movable weight until a maximum outward position of the movable weight is reached which combines with the fixed weight to produce a maximum unbalance and therefore a maximum vibratory motion. The maximum outward position is reached when the centrifugal force of the weight is equal to the tension force (or returning force) of the spring. Admitting fluid under pressure to the piston outboard of the spring will move the movable weight against the centrifugal force and, aided by the spring, in a radial inward direction until the center of gravity of the movable weight reaches the original stationary position. Thereafter, movement of the piston and movable weight will compress the spring until the center of gravity of the movable weight passes the axis of rotation of the shaft whereupon further movement of the piston and movable weight will move the center of gravity beyond the axis of rotation so that centrifugal force will move the movable weight outward. The compressive forces of the spring will resist but will not prevent the outward movement of the movable weight. At the outermost position of the movable weight, the forces of the movable weight will balance the forces of the fixed weight so that the wheel-like member is in balance and there will be no vibratory forces created by the member. The ratio between the fluid pressure and the movement of the movable weight is linear making control simpler and predictable.

An assembly is provided whereby by rotating the wheel and movable weight 180° relative to the fixed weight converts the apparatus from a 0 pressure 0 vibratory force system to a 0 pressure maximum vibratory force system.

BRIEF DESCRIPTION OF THE DRAWINGS

FIG. 1 is a side elevational view of a vibratory feeder embodying the invention;

FIG. 2 is an enlarged cross-sectional view of one of the two wheel-like members affixed to the motor shaft;

FIG. 3 is a view of a portion of FIG. 2 showing the movable weight in a changed position;

DESCRIPTION OF THE PREFERRED EMBODIMENT

Figure 4:
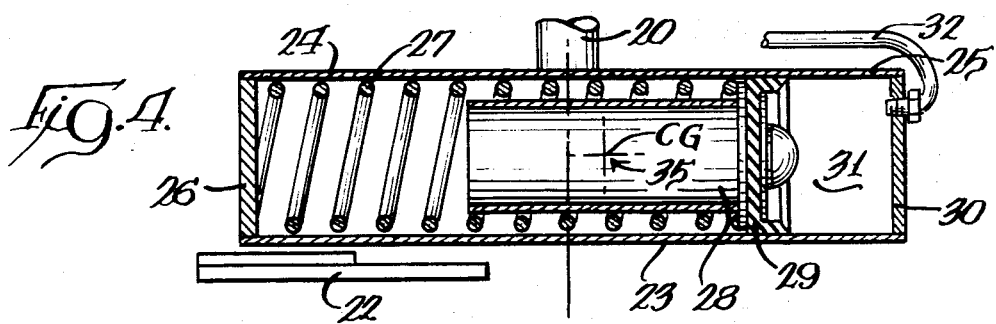
FIG. 4 is a sectional view taken generally along the longitudinal axis of the assembly as shown in FIG. 2.

Referring to the drawings, in FIG. 1 there is shown a vibratory feeder 10 similar to that shown in U.S. Pat. No. 3,358,815, and includes a material-carrying member in the form of a trough 11 mounted on isolation springs 12 supported on legs 13 upstanding from a base 14. The vibration generating apparatus includes an exciter member generally designated as 15 having a constant speed electric motor 16. The electric motor is connected to frame member 17 secured to the trough 11 through the medium of rubber shear springs such as shown in my previous U.S. Pat. Nos. 3,089,582 and 3,358,815. The rubber shear springs are diagrammatically shown at 18. Thus, the motor 16 is connected to the frame member 17 through a spring system and the motor operates at a constant speed near the natural frequency of such spring system.

The motor 16 has a motor shaft 20 indicated by dotted lines in FIG. 2 and the shaft carries at each end duplicate wheel-like members 21, one of which is shown and the other of which is identical in construction. Fixed on each wheel on one side of the axis of rotation of the shaft 20 is a fixed weight 22. Also mounted on each wheel is a cylinder 23 which extends radially on either side of the shaft 20. The cylinder has one end 24 near the center of gravity of the weight 22 and opposite end 25 on the other side of the axis of rotation of the shaft. A cap 26 closes the end 24 of the cylinder and secured thereto is a coil spring 27. Within the cylinder 23 is a weight 28 secured to a piston 29 slidable in the cylinder. The piston and weight together form a movable weight within the cylinder 23.

A cap 30 closes the end 25 of the cylinder to form therein a pressure chamber 31 between the piston 29 and the cap 30. A fluid pressure line 32 connects at one end to the pressure chamber 31 and at its other end to a rotatable connector 33 mounted on the shaft 20 as shown in FIG. 1. A fluid pressure line 34 connects at one end to the connector 33 and at its other end to a source of fluid under pressure, for example, compressed air.

When at rest, the center of gravity (indicated at 35) of the piston and weight system plus that portion of the spring 36 located to the right of the axis of rotation of the shaft as seen in FIG. 2 is in the position indicated. After startup and as the motor reaches operating speed, the piston and weight move outwardly from the axis of rotation to the position shown in FIG. 3. The rotation extends the spring 27 in tension opposing the centrifugal force on the piston and weight. In the position of the parts as shown in FIG. 3, the vibratory force generated by the fixed weight 22 and the spring portion to the left of the axis of rotation (as shown in FIG. 3) is equal and opposite to the vibratory force generated by the weight, piston, and spring portion 36 to the right of the axis of rotation, with the result that no vibratory force is imparted by the exciter member to the trough 11. Applying fluid pressure through the lines 34, connector 33, and line 32, and into the pressure chamber 31, will cause the piston and weight to move to the left (as shown in FIG. 3) with the tension of the spring initially assisting the force exerted by the fluid pressure but with the spring assistance diminishing as the piston and weight move toward the axis of rotation (thus reducing the centrifugal force exerted by those members) and finally as the piston and cylinder are moved further to the left beyond the position shown in FIG. 2, the coil spring resists further movement of the piston and weight which are then being moved to the left by a combination of fluid pressure and centrifugal force.

Thus it can be seen that when the centrifugal force generated by the movable weight and piston is at its greatest, as shown in FIG. 3, and is sufficient to move the weight and spring to the position shown in that figure against the tension of the spring, the spring tension assists the fluid pressure in moving the spring and weight to the left, with such assistance by the spring diminishing to zero as the piston and weight reach the position of FIG. 2, and then operating in compression and in opposition to the fluid pressure when the piston and weight move farther to the left from the position shown in FIG. 2, which movement of the piston and cylinder creates a centrifugal force tending to move them outwardly toward the fixed weight 22.

FIG. 4 is a sectional view of the wheel-like member 21 showing the fixed weight 22 attached to the member 21 and showing the center of gravity 35 of the movable weight 28 in the stationary position (prior to starting rotation of the motor and wheel-like member 21).

The modified form of the invention shown in FIGS. 5–8, inclusive, has a motor shaft 120 which carries duplicate wheel-like members 121, one of which is shown. Fixed on each wheel on one side of the axis of rotation of the shaft 121 is the fixed weight 122. A cylinder or carrier 123 which extends radially on either side of the shaft 120 has a longitudinal axis that lies in a plane that passes through the center of gravity of the fixed weight 122 and through the axis of rotation of the shaft 120. The cylinder or carrier 123 has one end portion 124 near the center of gravity of the fixed weight 122 and has an opposite end portion 125 on the diametrically opposite side of the axis of rotation of the shaft. A cap 126 closes the end 124 of the cylinder 123 with a bumper or stop member 140 extending through the midportion thereof into the inside of end portion 124.

Figure 5:
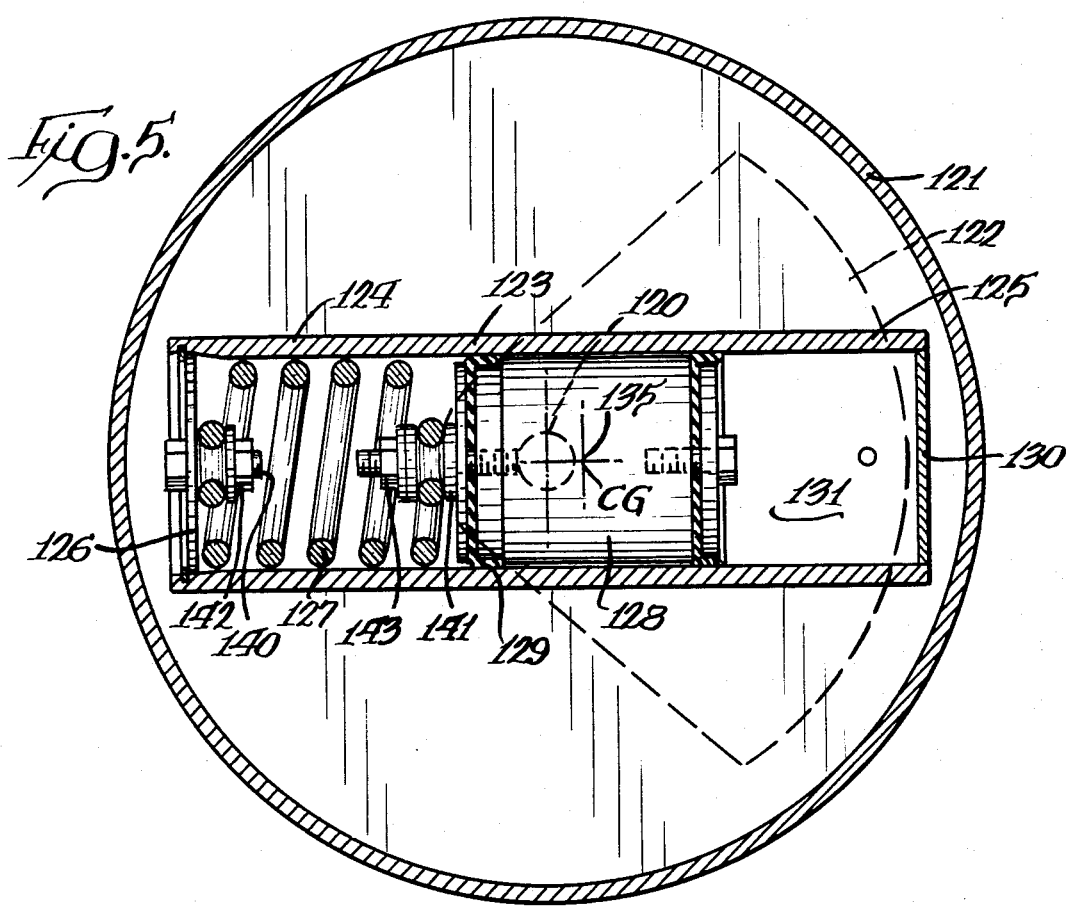
FIG. 5 is an enlarged cross-sectional view of a modified form of one of the two wheel-like members affixed to the motor shaft.
Figure 6:
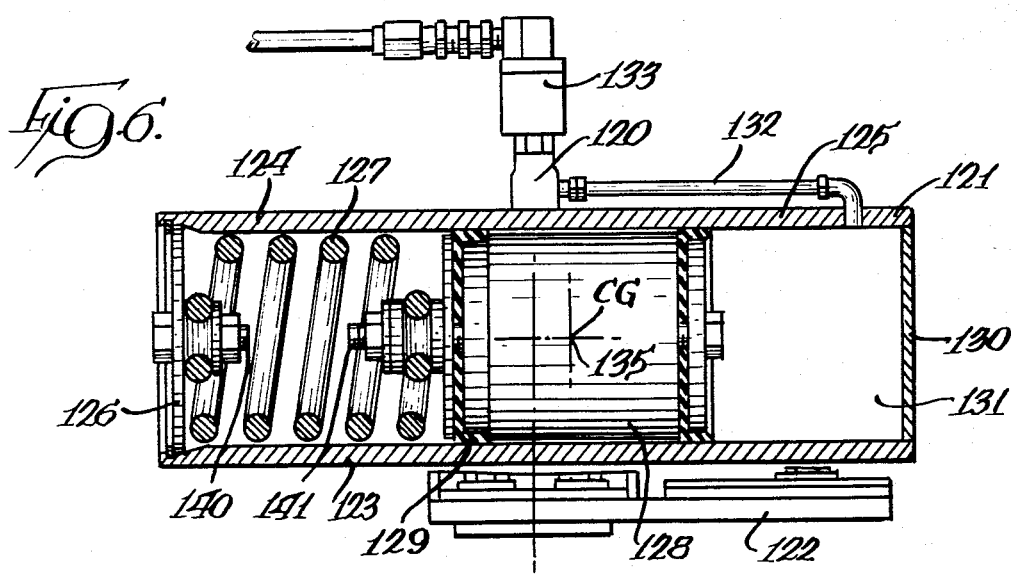
FIG. 6 is a sectional view taken generally along the horizontal axis of the assembly as shown in FIG. 5.

A coil spring 127 is secured to the end cap and is positioned in the end portion 124 of the cylinder. A weight 128 is secured to a piston 129 slidably mounted in the cylinder or carrier 123 with a second threaded stop member 141 extending from the midportion of the one end of the piston 129 toward the stop 140. The ends of the spring 127 are secured to the stop members 140,141 or to the end cap 126 and to one end of the piston 128. Adjusting nuts 142,143 are, respectively, threaded on the stop members 140,141 so as to adjust the positions of the stop members relative to each other. As shown in FIGS. 5 and 6, in the at rest or stationary position of the wheel-like member the center of gravity 135 of the weight 128 is offset to the right of the axis of rotation. Stated another way, the center of gravity 135 of the movable weight 128 is displaced outboard of the center of rotation of the wheel on the side of the center of rotation opposite to the spring 127, with the spring in its neutral uncompressed, untensioned condition. The center of gravity of the movable weight 128 is displaced outboard of the axis of rotation of the wheel so that centrifugal forces will act on the movable weight 128 upon rotation of the wheel.

A cap 130 closes the end 125 of the cylinder to form therein a pressure chamber 131 between one end of piston 129 and the cap 130. A fluid pressure line 132 connects at one end to the pressure chamber 131 and at its other end to a rotatable connector 133 mounted on the shaft 120. A fluid pressure line 134 connects at one end to the connector 133 and at its other end to a source of fluid under pressure. The fluid can be air, hydraulic or pneumatic.

Figure 7:
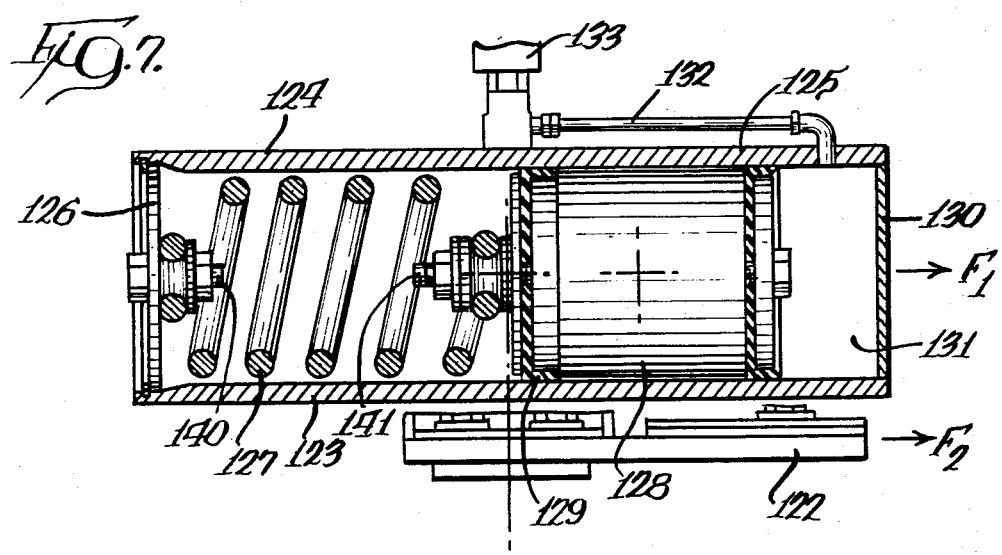
FIG. 7 is a view similar to FIG. 6 only showing the movable weight at one extreme position in the carrier.

At startup, with no pressure in the chamber 131, and as the motor reaches operating speed, the piston and weight 128 move radially outward from the axis of rotation to the position shown in FIG. 7. The rotation of the wheel extends the spring 127 in tension opposing the centrifugal force on the piston and weight until at the rated speed of rotation of the motor an equilibrium position is reached, i.e. the centrifugal force of the movable weight and piston equals the tension force of the spring. In the equilibrium position shown in FIG. 7 with the motor running at its rated speed, the centrifugal force ($F_2$) acting on the fixed weight 122 combines with the centrifugal force ($F_1$) of the movable weight 128 and piston 129 to generate the maximum vibratory force ($F_1 + F_2 =$ Max.) for transmission by the exciter member to the trough.

Figure 8:
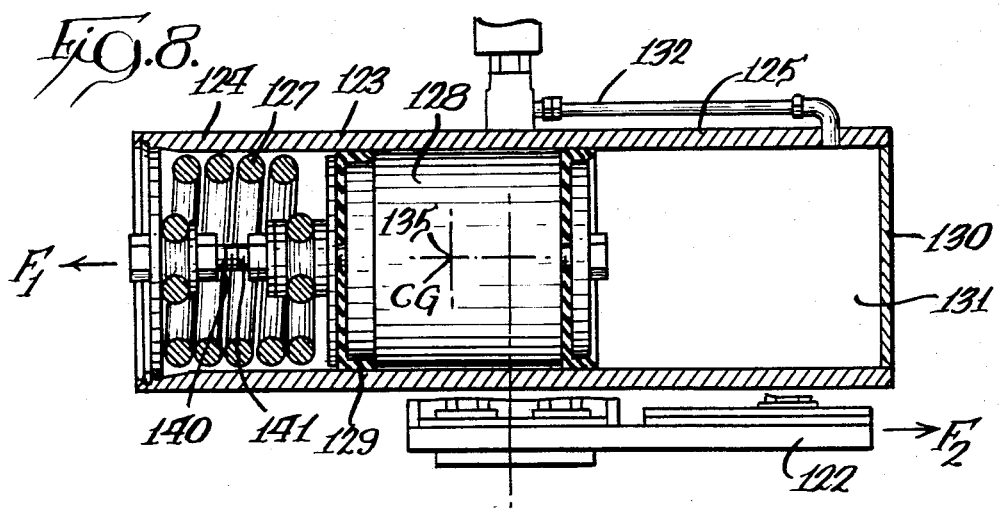
FIG. 8 is a view similar to FIG. 6 only showing the movable weight at the other extreme position of the carrier.

Applying pressure through the lines 134, connector 133 and line 132 into the pressure chamber 131 will move the piston 129 and weight 128 toward the left as shown in FIG. 8 with the tension of the spring 127 initially assisting the force exerted by the fluid pressure. The assistance afforded by the spring to the pressure in the chamber diminishes to 0 as the tension in the spring reaches 0. The centrifugal force exerted by the movable weight 128 and piston 129 is gradually reduced to 0 as the center of gravity of the movable weight and piston reaches the axis of rotation of shaft 120. Further increase in the pressure in the chamber 131 will move the movable weight 128 and piston 129 beyond the axis of rotation of the shaft whereby centrifugal forces will act on the movable weight which together with the pressure in the chamber will compress the spring 127. The compression of the spring 127 resists but does not neutralize the forces generated by the pressure in chamber 131 and the centrifugal forces acting on the weight 128 and piston 129. The forces ($F_1$) of the movable weight 128 and piston 129 continue to diminish the vibratory forces ($F_2$) created by the fixed weight 122 until the forces ($F_1$) counterbalances the forces ($F_2$) whereupon no vibratory forces are imparted by the exciter member to the trough 11.

With the motor running and the wheel rotating, the spring 27 in the FIGS. 2–4 version has one end portion which extends beyond the axis of rotation of the shaft and therefore contributes to the force balance in the system in that the centrifugal forces acting on that portion of the spring on the right side of the axis of rotation acts to partially balance the centrifugal forces acting on that portion of the spring to the left of the axis of rotation. As the spring lengthens or shortens, the effect on the system varies. In the FIGS. 5–8 version, the spring 127 is on the left side of the axis of rotation so its centrifugal effect is always in a direction to contribute to counterbalancing the centrifugal force of the fixed weight 122. In the fully extended condition of the spring of FIG. 7, the center of gravity of the spring is closer to the center of rotation so that the centrifugal force contributed to the system will be less than when the spring is compressed in the outboard position such as shown in FIG. 8.

Figure 9:
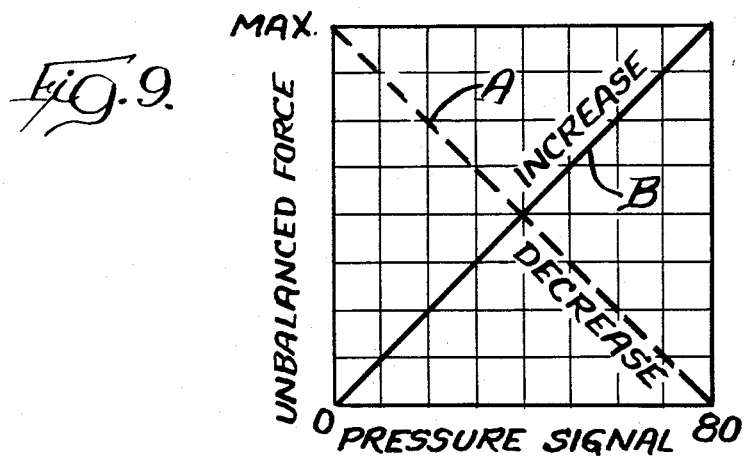
FIG. 9 is a chart showing the linear relationship between the pressure applied to move the movable weight and the unbalanced force.

Any static pressure can be used in the chamber 131 which pressure can be created by pneumatic fluid, hydraulic fluid or other liquid or gaseous fluids such as oil, air or the like. The apparatus has functioned unfailingly using fluid at a pressure of from 0 to 80 psi. The position of the movable weight is always established by the pressure balance which is a combination of centrifugal force and spring force. The chart of FIG. 9 plots the linear relationship between the applied pressure (applied to the piston in chamber 131) and the unbalanced force (as transmitted to the trough). The pressure applied in chamber 131 in pounds per square inch translates directly into the unbalanced force. Line A on the chart illustrates the linear function of the apparatus of FIGS. 5–8 wherein a 0 pressure in the chamber 131 with the motor running at rated speed will produce a maximum unbalanced force for the system. At 40 psi in the chamber 131 the unbalanced force will be about half and at 80 psi the unbalanced force will be 0; i.e. no vibratory forces will be transmitted to the trough. Line B illustrates the linear function of the apparatus of FIGS. 2–4 wherein when a pressure of 80 psi is applied in the chamber 131 with the motor running at rated speed, the maximum unbalanced force is generated and maximum vibratory forces are transmitted to the trough. At 40 psi the unbalanced force will be about half and at 0 psi the unbalanced force will be 0.

In the modified form of the invention shown in FIGS. 10–13, an apparatus is shown wherein the static position of the movable weight with respect to the fixed weight is reversible so that in one set up the FIGS. 2–4 relationship is locked in (0 psi pressure in the chamber produces 0 unbalanced forces) and in the other set up the FIGS. 5–8 relationship is locked in (0 psi pressure in the chamber produces maximum unbalanced forces).

The wheel 221 is shown in three parts 250, 252, 254 with end parts 250 and 254 being mirror images of each other and being interchangeably bolted by bolts 256 to the center part 252. The center part 252 has an axial bore 258 aligned with blind humps 260 on the end parts 250, 254. A cylindrically shaped sleeve 262 forming a cylinder or carrier 264 is fitted and secured in the axial bore 258 and extends on one end into the hump 260 on end part 250. A movable weight 228 is slidably disposed in the cylinder 264 and has a piston 266 attached thereto on the closed end 268 of the cylinder to define a pressure chamber 231 between the piston 266 and the end 268 of the cylinder 264.

A coil spring 227 is secured to the hump 260 of the end part 254 by bolt and nut 270 securing one pigtail end 271 of the spring to the end part 254. The other end of the spring 227 is secured to the movable weight 228 and piston 266 by a through bolt 272 and nut 274 passing through the pigtail 275 on the other end of the spring 227.

The wheel 221 is driven by the motor shaft 220 which carries a duplicate wheel 221 on the other end of said shaft. The wheel 221 is bolted by bolts 276 to a fixed weight 222 which weight in turn is affixed to the motor shaft. The fixed weight 222 has a center of gravity outboard (or below in FIG. 10) of the axis of rotation of the shaft. The carrier or cylinder 262 has a longitudinal axis that lies in a plane that passes through the center of gravity of the fixed weight 222 and through the axis of rotation of the shaft 220.

A fluid pressure line 232 connects at one end to the pressure chamber 231 and at its other end to a rotatable connector 233. A fluid pressure line connects the connector 233 to a source of fluid under pressure. The fluid can be air, hydraulic or pneumatic.

Figure 10:
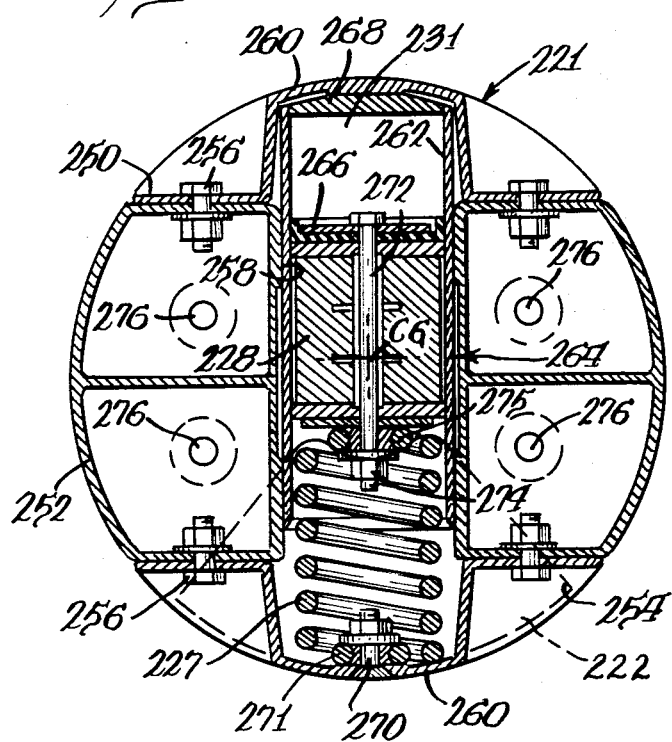
FIG. 10 is an elevational view partially broken away of another modified form of the invention.
Figure 11:
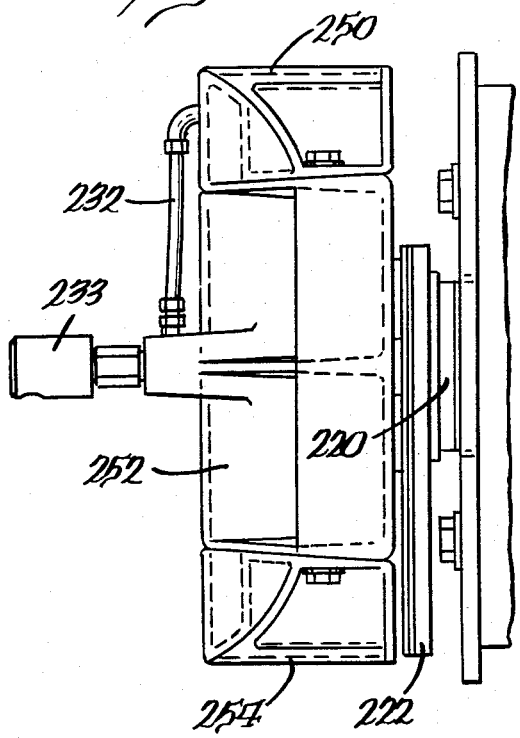
FIG. 11 is an end view of the structure of FIG. 10.

In the static state of FIGS. 10 and 11 the center of gravity of the fixed weight is below the rotational axis of the shaft and the spring 227 positions the center of gravity of the movable weight 228 on the opposite side of the rotational axis of the shaft. The operating principle of the assembly of FIGS. 10 and 11 are the same as for FIGS. 2–4 wherein at rated speed of rotation and 0 pounds of pressure in the chamber 231, the movable weight will be balanced by the tensioning spring force and by the fixed weight so that no vibratory forces are generated. At maximum pressure in the chamber the movable weight will move against the compression of the spring and produce maximum vibratory forces.

Figure 12:
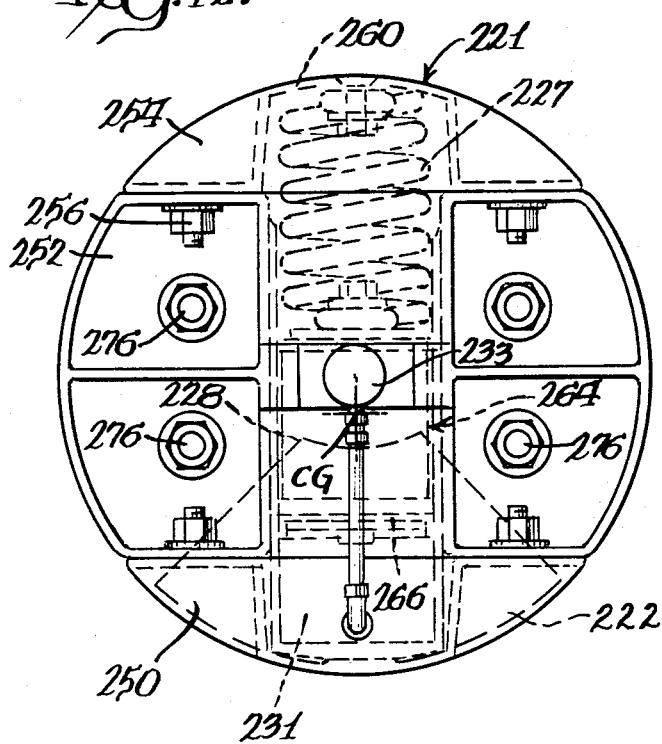
FIG. 12 is an elevational view of the modified form of the invention shown in FIG. 10 only adapted for a different vibratory force set up.
Figure 13:
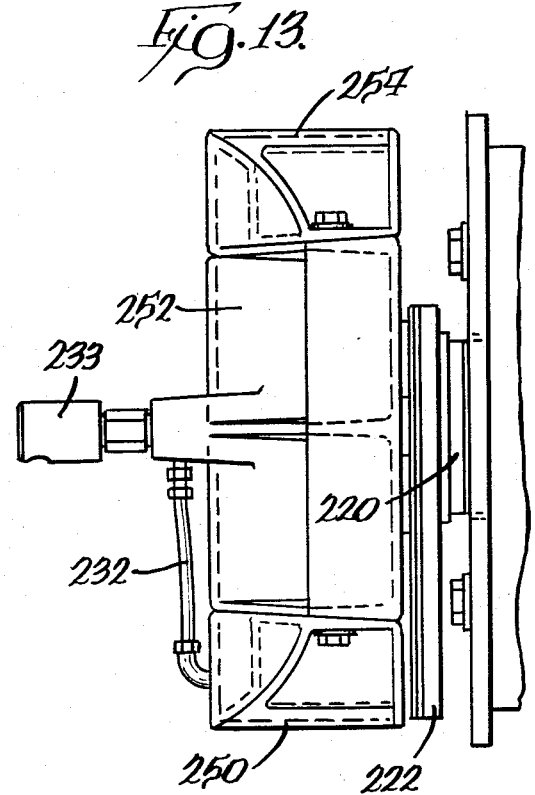
FIG. 13 is an end view of the structure of FIG. 12.

Unbolting bolts 276 and rotating the wheel 221 relative to the fixed weight 222 by 180° and reinserting and rebolting the wheel 221 to the fixed weight 222 will result in the structure of FIGS. 12 and 13 wherein the center of gravity of the movable weight 228 is on the same side of the axis of rotation of the shaft as is the center of gravity of the fixed weight. A structure identical to the structure and operation of FIGS. 5–8 is the result wherein at 0 pounds pressure and rated speed of rotation maximum vibratory forces are generated and at maximum applied pressure in chamber 231 the vibratory forces generated will be 0.

The apparatus of FIGS. 10–13 is capable of operating in either of the two alternative ways by merely reorienting the wheel relative to the fixed weight by 180°.

It is especially advantageous to use a coil spring in the arrangement shown due to the fact that the deflection of a coil spring in either tension or compression is directly proportional to the force, i.e., is in linear relationship. This linear relationship contributes to the ease and accuracy of control of the vibratory force produced by the system.

I claim:

1. Apparatus for varying the vibratory force generated by a rotating mass comprising a rotatably mounted shaft, an eccentric weight mounted in a fixed position on the shaft, means for rotating the shaft, a cylinder carried by the shaft, said cylinder extending radially on either side of said shaft, a weight mounted for axial movement in the cylinder, a tension and compression spring in the cylinder urging the movable weight toward a position with the center of gravity on one side of the axis of the shaft, said spring being attached at one end to the cylinder and at the other end to the movable weight, fluid pressure responsive means in the cylinder and bearing on the side of the movable weight opposite to the spring to move the movable weight from the position on one side of the axis of the shaft toward a position on the other side of the axis of the shaft and means connecting said fluid pressure responsive means to a source of fluid under pressure.

2. Apparatus for varying the vibratory force generated by a rotating mass comprising a rotatably mounted shaft, means for rotating the shaft, a wheel-like device carried by the shaft, a weight mounted on the wheel in a fixed position on one side of the axis of rotation of the shaft, a cylinder mounted on the wheel, said cylinder having one end positioned adjacent the center of gravity of said fixed weight and extending radially of the wheel to locate the opposite end of the cylinder on the other side of the axis of rotation of the shaft, a second weight movably mounted for axial movement in the cylinder, a tension and compression spring in the cylinder and connected at one end to one end of the cylinder and at the other end to the movable weight for urging the movable weight toward a position on the side of the axis of rotation of the shaft opposite to the position of the fixed weight, fluid pressure responsive means operable in the cylinder to move the movable weight initially toward the axis of rotation of the shaft and subsequently toward a position on the other side of the axis of the shaft and means connecting said fluid pressure responsive means to a source of fluid under pressure.

3. Apparatus for varying the vibratory force generated by a rotating mass comprising a rotatably mounted shaft, means for rotating the shaft, a wheel-like device carried by the shaft, a weight mounted on the wheel in a fixed position on one side of the axis of rotation of the shaft, a cylinder mounted on the wheel, said cylinder having one end positioned adjacent the center of gravity of said weight and extending radially of the wheel to locate the opposite end of the cylinder on the other side of the axis of rotation of the shaft, a second weight movably mounted for axial movement in the cylinder, a coil spring in the cylinder having its one end secured to said one end of the cylinder and having its other end secured to the movable weight, said spring being designed and arranged to move the movable weight to a position on the other side of the axis of rotation of the shaft from said fixed weight toward but not at said opposite end of the cylinder when the shaft is at rest, and said spring tensionally resisting but not preventing movement of the movable weight to said opposite end of the cylinder when the shaft is rotated, a piston in the cylinder secured to the movable weight, said piston being operable in response to fluid pressure to move the movable weight in a direction toward the fixed weight, a source of fluid pressure and means connecting said source to said piston to cause movement thereof.

4. Apparatus for varying the vibratory force generated by a rotating mass comprising a rotatably mounted shaft, means for rotating the shaft, a wheel-like device carried by the shaft, a weight mounted on the wheel in a fixed position on one side of the axis of rotation of the shaft, a cylinder mounted on the wheel, said cylinder having one end positioned adjacent the center of gravity of said weight and extending radially of the wheel to locate the opposite end of the cylinder on the other side of the axis of rotation of the shaft, a second weight movably mounted for axial movement in the cylinder, a coil spring in the cylinder having its one end secured to said one end of the cylinder and having its other end secured to the movable weight, said spring being designed and arranged to move the movable weight to a position on the other side of the axis of rotation of the shaft from said fixed weight toward but not at said opposite end of the cylinder when the shaft is at rest and said spring tensionally resisting but not preventing movement of the movable weight to said opposite end of the cylinder when the shaft is rotated, a piston in the cylinder secured to the movable weight, means at said opposite end of the cylinder forming with the piston a fluid pressure chamber, the arrangement being such that when said movable weight is adjacent said opposite end of the cylinder the vibratory force generated by the movable weight and the portion of the spring on said other side of said axis of rotation substantially counterbalances the vibratory force generated by the fixed weight and the portion of the spring between said axis and said one end of the cylinder, a source of fluid under pressure and means connecting said source with said pressure chamber, the application of fluid pressure to said chamber moving said piston and movable weight in a direction toward said fixed weight.

5. Apparatus for varying the vibratory force generated by a rotating mass comprising a rotatably mounted shaft, a weight fixed to the shaft having its center of gravity offset from the axis of rotation of the shaft, a carrier secured to the shaft and extending radially thereof on either side of the axis of rotation of the shaft, a second weight movably carried by the carrier, tension and compression spring means attached at opposite ends to the carrier and to the second weight and positioning the movable weight in a first position on one side of the axis of rotation of the shaft and means for moving said movable weight from said first position toward a second position on the other side of the axis of rotation of said shaft.

6. Apparatus for varying the vibratory force generated by a rotating mass comprising a rotatably mounted shaft, a weight fixed to the shaft having its center of gravity offset from the axis of rotation of the shaft, a carrier secured to the shaft and having a longitudinal axis extending radially thereof on either side of the axis of rotation of the shaft, the axis of the carrier passing through the center of gravity of the weight fixed on the shaft, a second weight movably carried by the carrier, tension and compression spring means in the carrier attached at one end to the carrier and at the other end to the second weight, said spring means positioning the second weight in a position on one side of the axis of rotation of the shaft and means for moving the second weight from said position on one side of the axis of rotation of the shaft toward a second position on the other side of the axis of rotation of said shaft, said second weight when on the same side of the shaft as the fixed weight adds to the vibratory force generated by the rotating mass and when on the opposite side of the shaft reduces the vibratory force generated by the rotating mass.

7. Apparatus for varying the vibratory force as claimed in claim 6 wherein the center of gravity of the fixed weight and the center of gravity of the second weight are initially on the same side of the axis of rotation of the shaft.

8. Apparatus for varying the vibratory force as claimed in claim 6 wherein the center of gravity of the fixed weight is on the opposite side of the axis of rotation of the shaft from the center of gravity of the second weight.

9. Apparatus for varying the vibratory force as claimed in claim 7 wherein the means for moving the second weight is a piston positioned in the carrier and connected to the second weight and wherein hydraulic or pneumatic pressure is applied to the piston to move the center of gravity of the second weight from a position on the same side of the axis of rotation of the shaft as the piston to a position on the opposite side of the axis of rotation of the shaft.

10. Apparatus for varying the vibratory force generated by a rotating mass comprising a rotatably mounted shaft, means for rotating the shaft, a wheel-like device carried by the shaft, a weight mounted on the wheel in a fixed position with its center of gravity on one side of the axis of rotation of the shaft, a cylinder mounted on the wheel, said cylinder having a longitudinal axis passing through the center of gravity of said weight and extending radially of the axis of rotation of the shaft on both sides of the axis of rotation of the shaft, a second weight movably mounted for axial movement in the cylinder, a tension and compression spring in the cylinder and having one end secured to the cylinder and having the other end secured to the movable weight for positioning the movable weight in a position on one side of the axis of rotation of the shaft, fluid pressure responsive means operable to move the movable weight toward a position on the other side of the axis of the shaft, and means connecting said fluid pressure responsive means to a source of fluid under pressure, said second weight being movable from a position on the same side of the axis of the shaft as the fixed weight to a position on the other side of the axis of the shaft from the fixed weight.

11. Apparatus for varying the vibratory force generated by a rotating mass comprising a rotatably mounted shaft, means for rotating the shaft, a wheel-like device carried by the shaft, a weight mounted on the wheel in a fixed position with its center of gravity on one side of the axis of rotation of the shaft, a cylinder mounted on the wheel, said cylinder having a longitudinal axis passing through the center of gravity of said weight and extending radially of the axis of rotation of the shaft on both sides of the axis of rotation of the shaft, a second weight movably mounted for axial movement in the cylinder, a tension and compression coil spring in the cylinder having its one end secured to one end of the cylinder and having its other end secured to the movable weight, said spring positioning the movable weight on the other side of the axis of rotation of the shaft from said secured end of said spring when the shaft is at rest, and said spring tensionally resisting but not preventing movement of the movable weight outward of the axis of rotation when the shaft is rotated, a piston in the cylinder secured to the movable weight, said piston being operable in response to fluid pressure to move the movable weight with the aid of tension in the spring in a direction toward and beyond the at rest position and beyond the axis of rotation against the compression of the spring, a source of fluid pressure and means connecting said source to said piston to cause movement thereof.

12. Apparatus for varying the vibratory force as claimed in claim 11 wherein said movable weight is initially positioned on the same side of the axis of rotation as the fixed weight and wherein centrifugal force moves the movable weight against the tension of the spring and into a maximum vibratory force condition.

13. Apparatus for varying the vibratory force as claimed in claim 11 wherein said movable weight is positioned on the other side of the axis of rotation as the fixed weight and whereby centrifugal force moves the movable weight against the tension of the spring and into a zero vibratory force condition.

14. Apparatus for varying the vibratory force generated by a rotating mass comprising a rotatably mounted shaft, means for rotating the shaft, a wheel-like device carried by the shaft, a weight mounted on the wheel in a fixed position with its center of gravity on one side of the axis of rotation of the shaft, a cylinder mounted on the wheel, said cylinder having a longitudinal axis passing through the center of gravity of said weight and extending radially of the axis of rotation of the shaft on both sides of the axis of rotation of the shaft, a second weight movably mounted for axial movement in the cylinder, a tension and compression spring in the cylinder attached at one end to the cylinder and at the other end to the second weight, said spring initially positioning the movable weight in a position on one side of the axis of rotation of the shaft, fluid pressure responsive means operable to move the movable weight toward a position on the other side of the axis of the shaft, means connecting said fluid pressure responsive means to a source of fluid under pressure and means for locating the wheel-like device in one of two positions on the fixed weight, one position locating the movable weight on the same side of the axis of rotation as the fixed weight and the other position locating the movable weight on the opposite side of the axis of rotation from the fixed weight.

* * * * *